United States Patent [19]

Bourdon

[11] 4,109,987
[45] Aug. 29, 1978

[54] POLARIZING AND LOCKING MEANS FOR MATEABLE UNITS SUCH AS ELECTRICAL CONNECTORS

[75] Inventor: Normand Charles Bourdon, Sidney, N.Y.

[73] Assignee: The Bendix Corporation, Southfield, Mich.

[21] Appl. No.: 832,510

[22] Filed: Sep. 12, 1977

Related U.S. Application Data

[63] Continuation of Ser. No. 679,296, Apr. 22, 1976, abandoned.

[51] Int. Cl.² .................... H01R 13/54; H01R 13/64
[52] U.S. Cl. .............................. 339/75 M; 339/186 M
[58] Field of Search ............. 339/75 R, 75 M, 186 R, 339/186 M, 187

[56] References Cited

U.S. PATENT DOCUMENTS

| | | | |
|---|---|---|---|
| 1,670,849 | 5/1928 | Doran | 339/187 |
| 2,855,454 | 10/1958 | Alden | 339/75 M |
| 3,177,462 | 4/1965 | Sarnmark | 339/186 M |
| 3,594,698 | 7/1971 | Anhalt | 339/75 M |
| 3,950,059 | 4/1976 | Anhalt et al. | 339/186 M |

*Primary Examiner*—Neil Abrams
*Attorney, Agent, or Firm*—Kenneth A. Seaman; Raymond J. Eifler; S. H. Hartz

[57] ABSTRACT

Polarizing and locking means for a pair of mateable units including a member having a key on one unit and a member having a plurality of keyways on the other unit. A ring-shaped element selectively obstructs all the keyways but one on the associated member and the key is angularly disposed on the other member to register with the unobstructed keyway when mating the units. One of the members is moved axially and rotated to engage the key with the rear wall between the keyways for locking the units together.

8 Claims, 8 Drawing Figures

POLARIZING AND LOCKING MEANS FOR MATEABLE UNITS SUCH AS ELECTRICAL CONNECTORS

This is a continuation of application Ser. No. 679,296, filed Apr. 22, 1976 and now abandoned.

The invention relates to polarizing means for selectively matching separable mateable parts such as a connector plug and receptacle.

PRIOR ART

Separable electrical connectors are employed in computer and control installations. Receptacle connector parts are mounted on a panel adjacent to each other and the mating connector parts are connected to respective flexible cables. Unless the connector parts are correctly mated malfunctioning or severe electrical damage to the apparatus may result. The polarizing means prevents incorrect mating of the several parts of the connectors.

Polarizing means for mating connector parts are shown in U.S. Pat. No. 3,714,617, assigned to the same assignee as the present application. The polarizing means described therein includes a semicircular stem on a male member which is received in a semicircular bore in an associated female member when the members are properly oriented in mated relationship. The members are positioned and maintained in mated relationship by octagonal surfaces on the parts engaging corresponding surfaces on the members. While the polarizing means shown in the patent properly identifies mating parts of a connector, the parts may be accidently separated by vibration or other cause.

SUMMARY OF THE INVENTION

The present invention is directed to polarizing means which properly identifies mateable members and, in addition, locks the mateable members against accidental separation. The polarizing and locking means may be readily installed in a pair of separable members and may be selectively and adjustably positioned in a large number of similar or identical units for distinguishing one from another. The locking means is vibration proof, but can be unlocked easily to disconnect the mated members. The polarizing means is always in polarized position when the members are separated. The polarizing means can be quickly and easily coded and permits visually checking the coding before connecting one member to the other.

The invention contemplates a device having a pair of mateable units comprising polarizing means including a first member on one of said units having an extension with a predetermined shape and a second member associated with the other unit and having an opening with a predetermined complementary shape for receiving the first member when the units are in mating position, and locking means including means on one of the members for engaging means on the other member after assembling the units to lock the members and prevent their accidental separation.

DRAWINGS

FIG. 1 is an isometric view partly in section showing a polarizing and locking arrangement for mateable connector parts constructed according to the invention, FIG. 2 is a detail showing the front face of the connector plug, FIG. 3 is a detail showing the rear face of the connector plug, FIG. 4 is a detail showing the front face of the connector receptacle, FIG. 5 is a detail showing the rear face of the connector receptacle, FIG. 6 is a detail showing the locking arrangement, FIG. 7 shows a second ring for polarizing the connector receptacle, and FIG. 8 is a view similar to FIG. 1 showing a second embodiment of the invention.

DETAILED DESCRIPTION OF THE INVENTION

Figure 1:
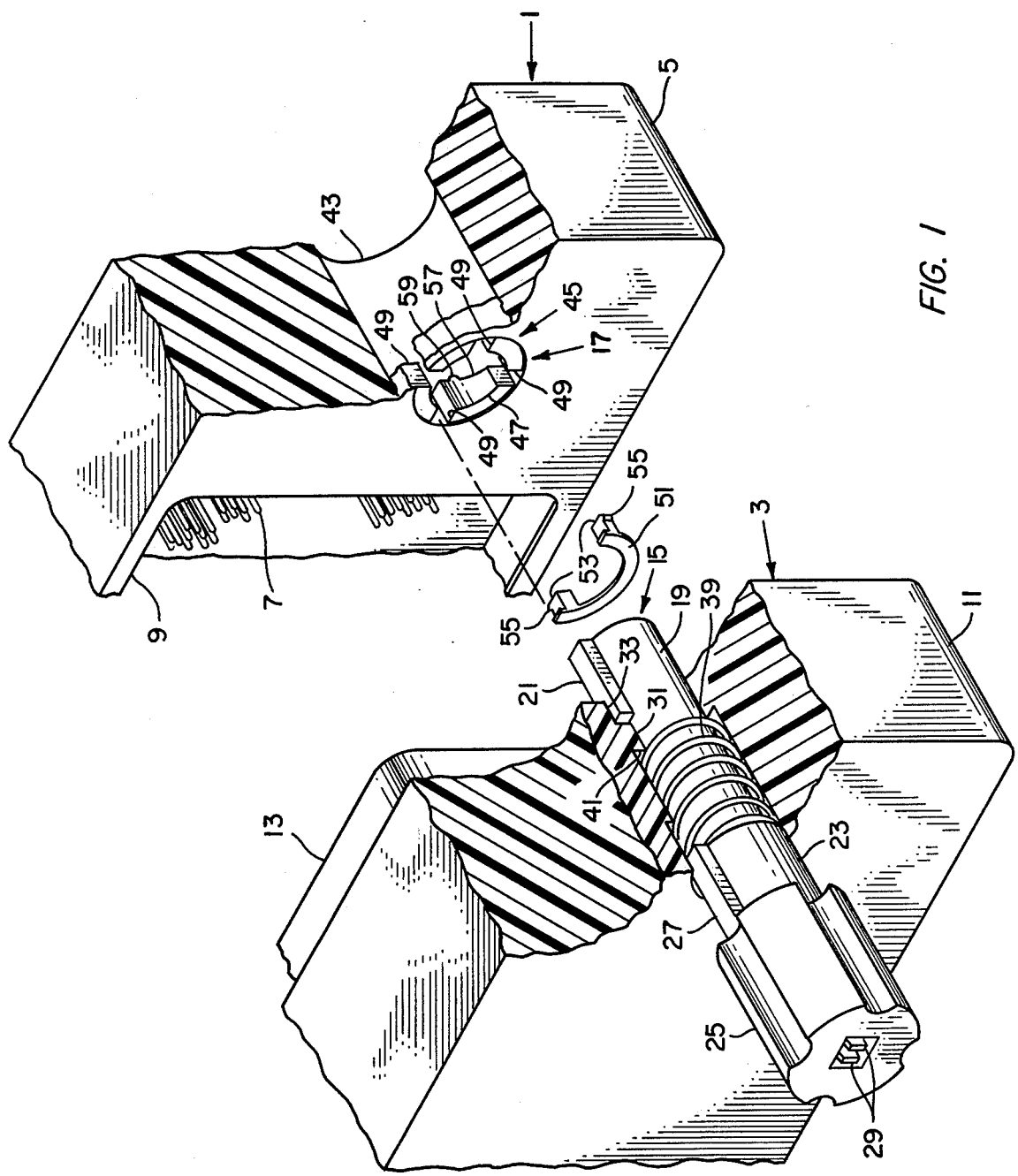

Referring to the drawings, the novel connector shown therein and constructed according to the invention comprises a receptacle 1 and a plug 3 separably mateable with one another. The receptacle includes a body 5 of rigid insulating material in which a plurality of pin contacts 7 are mounted in any suitable manner and extend into a cavity 9 in one face of the receptacle body.

Plug 3 includes a body 11 of rigid insulating material with an outwardly extending portion 13 which fits within cavity 9 of the receptacle. A plurality of socket contacts (not shown) are suitably mounted in the outwardly extending portion 13 of body 11. The socket contacts receive pin contacts 7 when receptacle 1 and plug 3 are assembled.

Figure 2:
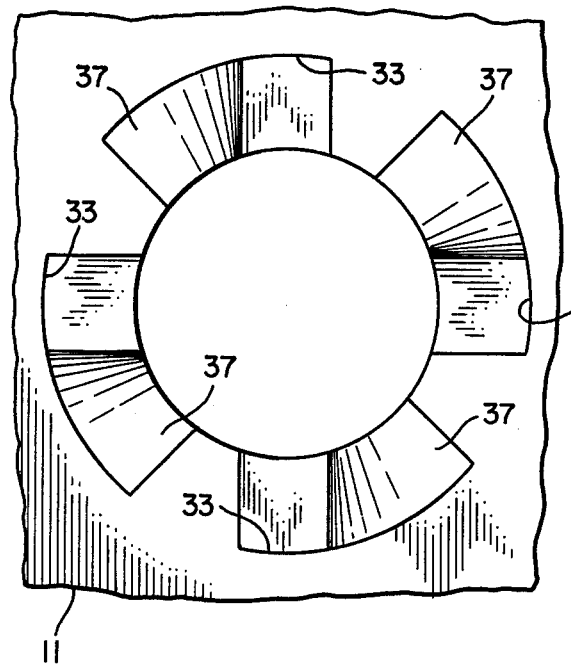
Figure 3:
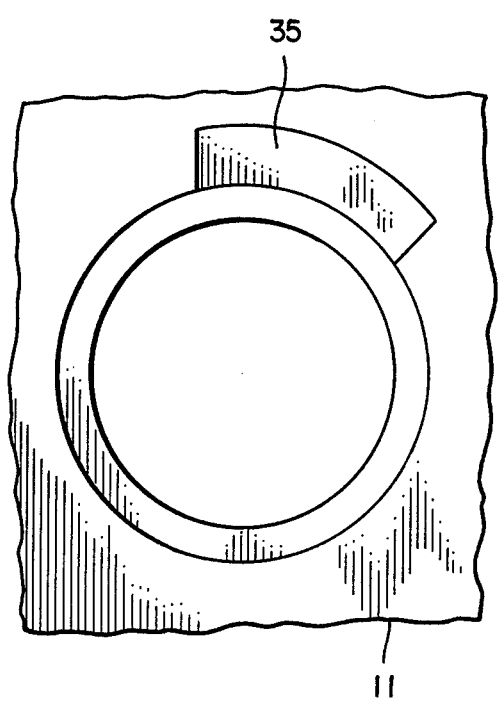
Figure 4:
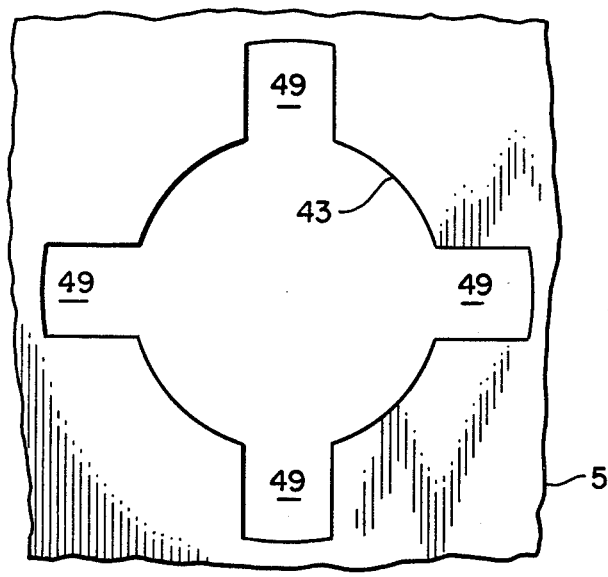
Figure 6:
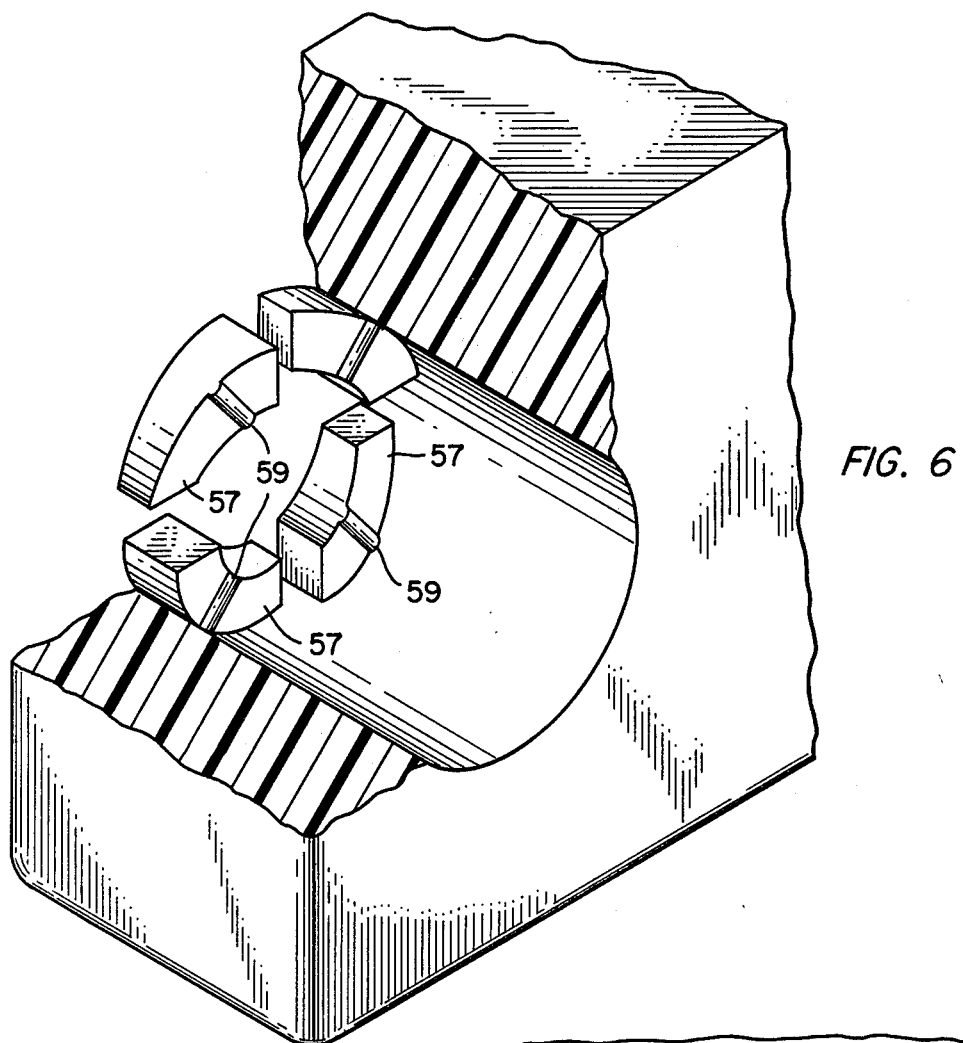

The novel polarizing means for distinguishing one receptacle and plug from otherwise similar or identical receptacles and plugs includes a pair of mateable members 15 and 17 disposed in the plug and receptacle bodies, respectively. Member 15 in the plug body comprises a shaft 19 with a key 21 at the front end of the shaft extending parallel to the shaft axis. A sleeve 23 having a serrated knob 25 at one end and a key 27 at the other end extending axially thereof is mounted on shaft 19 adjacent the rear face of the plug body and is maintained in assembly by a pair of spring elements 29 formed on the rear end of the shaft and engaging the sleeve. The plug body has a bore 31 extending therethrough from the front face to the rear face for receiving shaft 19. Arcuate slots 33 and 35 are formed in the front and rear faces for receiving keys 21 and 27, respectively, for permitting limited rotation of the shaft 19. Each arcuate slot 33 in the front face has a cam surface 37 (FIG. 2) for rotating the shaft to one end of the slot in mating position as described hereinafter. Arcuate slot 35 in the rear face permits shaft 19 to be moved manually in a forward direction when mating and locking the members 15 and 17 as described hereinafter, but limits shaft rotation so that key 21 cannot move beyond cam surface 37.

A compression spring 39 encircles shaft 19 and one end of the spring engages sleeve 23 and the other end of the spring engages a shoulder 41 in bore 31 and urges the shaft in a rearward direction. Movement of shaft 19 by spring 39 in a rearward direction is limited by key 21 engaging the end of the associated arcuate slot 33 in the front face of plug body 11.

Receptacle body 5 has a bore 43 therethrough for receiving shaft 19 and key 21 when assembling the plug and receptacle. At the front of the bore is a shallow wall 45 with an aperture 47 therein approximately the diameter of shaft 19. Wall 45 also has a plurality of keyways 49 extending radially outwardly from aperture 47 for receiving key 21 on shaft 19.

To identify the receptacle for mating with a plug, a semicircular ring 51 having legs 53 extending from the ring parallel to its axis is assembled to wall 45 with the legs positioned in keyways 49 and with shoulders 55 on the legs engaging the rear face of the wall. Ring 51 blocks all the keyways 49 except one.

Shaft 19 is assembled to plug body 5 with key 21 in a slot 33 in the plug body in registry with keyway 49 in wall 45 in the receptacle body not blocked by ring 51 so that the plug and connector mate with one another. The plug and receptacle are connected by inserting the forward end of shaft 19 into bore 43 in the receptacle body. The forward end of the shaft preferably is tapered to facilitate aligning the plug and receptacle. The plug and connector are locked by moving shaft 19 axially against the force of spring 39 until the rear end of key 21 clears the rear face of wall 45. The shaft is then rotated as the key rides up a ramp 57 on the rear face of the wall beyond a projection 59 on the ramp to hold the mateable members 15 and 17 in locked position.

The plug and receptacle are disconnected by moving shaft 19 axially in a forward direction against the force of spring 39 enough for key 21 to clear projection 59 on ramp 57 and rotating the shaft until the key registers with the unblocked keyway 49, whereupon the spring moves the shaft rearwardly until key 21 is bottomed at the end of slot 33 in the plug body. As mentioned above, cam surface 37 in slot 33 rotates shaft 19 until key 21 is in mating position with the open keyway 49 in the receptacle body should the shaft be rotated accidentally from mating position. With this arrangement the mating members on the plug and receptacle are always in mating position when the plug and receptacle are disconnected from one another.

Figure 7:
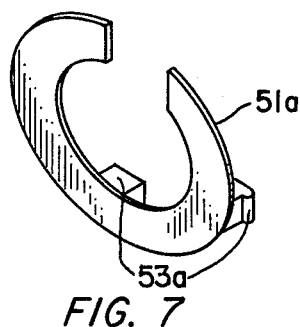
Figure 5:
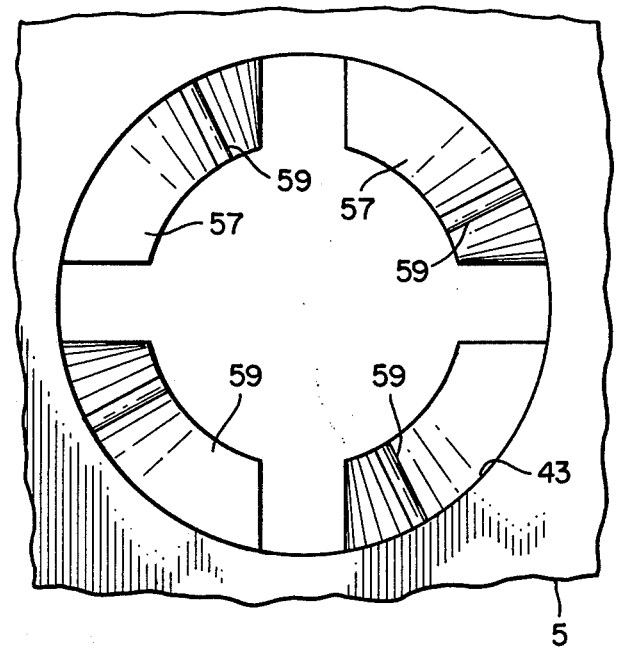

Two mating and locking assemblies as shown and described above may be used in each connector for mating purposes and, with four keyways 49 in each, sixteen different combinations are provided. While four keyways are used in the arrangement shown and described it should be understood that any convenient number of keyways may be used if more combinations are required. While a semicircular ring 51 has been shown in FIG. 1 any suitable arrangement may be used as long as it leaves at least one keyway 49 in the receptacle body unblocked. A ring 51a somewhat longer than a semicircle is shown in FIG. 7 and includes a pair of legs 53a adaped to be received in adjacent keyways 49 in wall 45.

Figure 8:
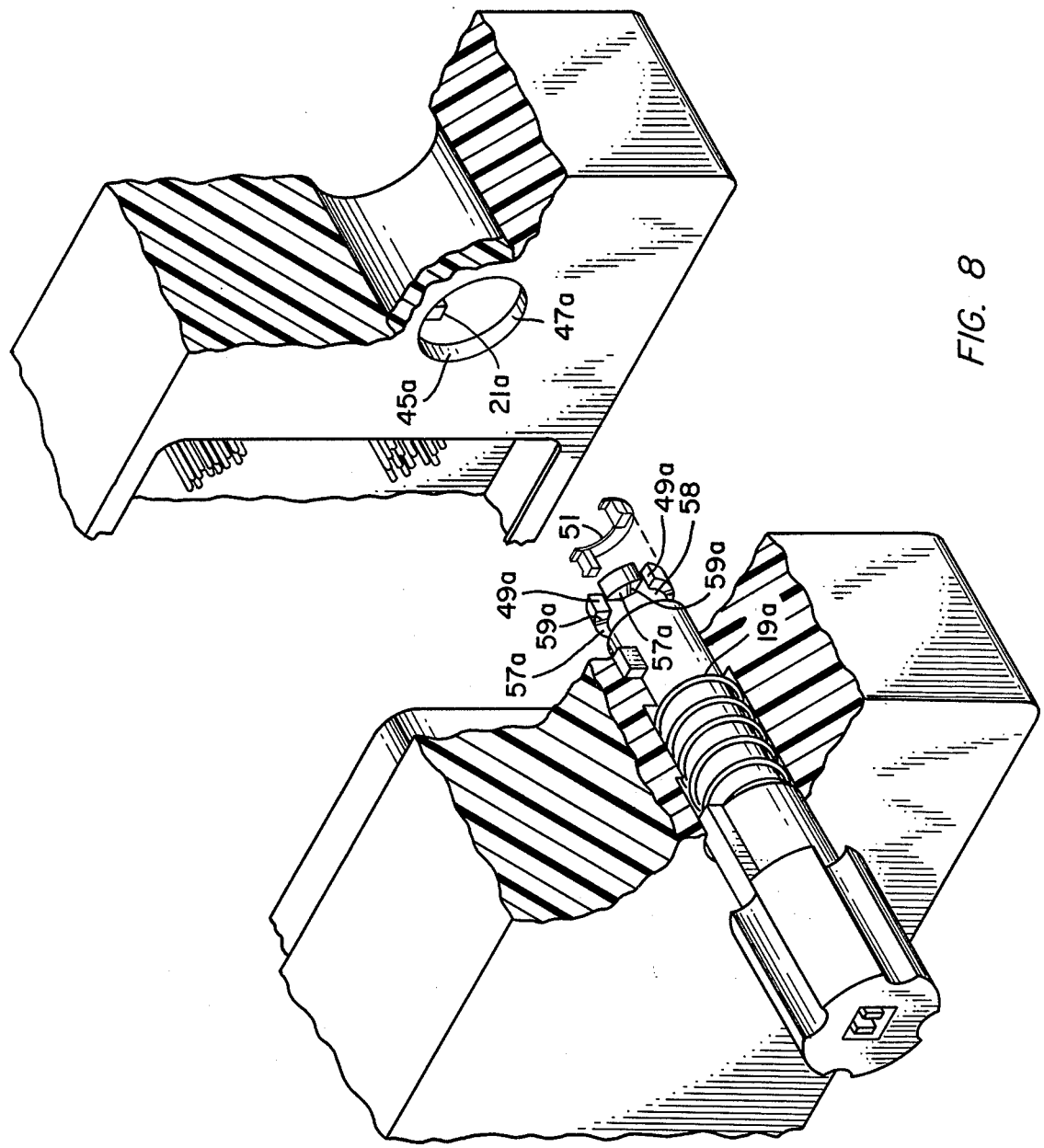

Although FIG. 1 shows key 21 on shaft 19 and keyways 49 in shallow wall 45, keyways 49a can be formed in shaft 19a and a key 21a can be formed on shallow wall 45a as shown in FIG. 8. A circumferential channel 58 in shaft 19a connects the keyways, and cams 57a and associated projections 59a are formed on the front bounding wall of the channel beteen the keyways. A ring 51 or 51a may be used to block all the keyways except one as shown in FIG. 1. An aperture 47a in shallow wall 45a preferably is tapered from front to rear to facilitate aligning the plug and receptacle. The device operates in the same manner as the device of FIG. 1 and the remainder of the structure is substantially the same as shown in FIG. 1.

The polarizing means constructed according to the invention properly identifies mateable members and also locks the mateable members against accidental separation. The polarizing and locking means may be readily installed in a pair of separable members and may be selectively and adjustably positioned in a large number of similar or identical units for distinguishing one from another. The locking means is vibration-proof but can be unlocked easily to disconnect the mated members. The polarizing means is always in polarized position when the members are separated. The polarizing means can be quickly and easily coded to permit visual checking of the coding before connecting one member to the other.

I claim:

1. A pair of separable connectors including polarizing means which comprises a first member mounted for rotational movement through a predetermined arc on one of said units, rotational limiting means at each end of said predetermined arc, said first member having an extension with predetermined shape including a projection on the extension, said projection located at a first radial location and being rotatable with the member through the predetermined arc; and a second member associated with the other unit and having a passage with an opening located at a second radial location chosen from a plurality of radial locations disposed about the passage, all of said locations including openings formed for receiving said projection, means for blocking such reception selectively located at certain of said openings other than the one at said second radial location, said plurality of locations separated by an angular distance greater than said arc, said passage having a predetermined complementary shape for receiving the first member when the units are in mating position with the projection located at the first radial location corresponding to the second radial location and for preventing mating when the first and second radial locations do not correspond; and locking means including means on one of the members for engaging means on the other member after assembling the units to lock the members and prevent their accidental separation.

2. A device as described in claim 1 in which one of the members has a key and the other member has a complementary keyway for receiving the key for polarizing the members, and the members are locked by moving one member relative to the other member to a position in which the key is beyond the end of the keyway and out of registry therewith.

3. A device as described in claim 2 in which one of the members includes a shaft rotatably supported in the associated unit and the other member includes a shallow wall with an aperture for receiving the shaft, and in which the members are locked by moving the shaft to a position in which the key engages a surface at the end of the keyway.

4. A pair of mateable units comprising:
a first unit;
a first member mounted to said first unit for rotational movement with respect to the first unit;
means coupled to said first unit and said first member for limiting the rotational movement of said first member with respect to said first unit to a predetermined arc;
a second member including an extension with a predetermined shape and a polarizing projection in a first position, said second member being rotatably and releasably coupled to the first member whereby said extension and polarizing projection are rotatable with respect to one another to allow the projection to have several positions, each of said positions being spaced from the others by an arc greater than the predetermined arc of allowable rotation between said first unit and said first member a second unit including an opening having a first portion shaped to receive the extension and a plurality of second portions, each shaped to receive the polarizing projection when the projection is aligned with one of the second portions, said plurality of second portions spaced from one another by an arc greater than the predetermined arc;

means for blocking less then all of the second portions to selectively polarize the second unit to prevent mating with a first unit when the projection aligns with a blocked second portion and to allow mating when the projection aligns with an unblocked second portion; and means for locking the first and second units together when mated to prevent the accidental separation.

5. A pair of mateable units of the type described in claim 4 wherein said first and second members are mounted to a passage in the first unit and the means for limiting the rotation of the first member to a predetermined arc includes an enlarged portion on the first member and the passage includes an undercut portion extending the predetermined arc for receiving the enlarged portion of the first member and limiting the rotation of the first member to the predetermined arc.

6. A pair of mateable units of the type described in claim 4 wherein the locking means includes a shallow wall separating the plurality of the plurality of second opening positions and, when the units are mated, the rotation of the first and second members through a portion of the predetermined arc moves the projection behind the shallow wall and away from alignment with the opening portion to lock the units.

7. A pair of mateable units of the type described in claim 4 wherein the blocking means, when coupled to the second unit, closes all except one of the second opening portions to render the second unit polarized to prevent mating with the first unit unless the projection of the second member aligned with the one unblocked opening portion.

8. A pair of mateable units comprising:

a first unit;

a first member mounted to said first unit for rotational movement with respect to the first unit;

means coupled to said first unit and said first member for limiting the rotational movement of said first member with respect to said first unit to a predetermined arc;

a second member including an extension with a predetermined shape and a polarizing projection in a first position, said second member being rotatably and releasably coupled to the first member whereby said extension and polarizing projection are rotatable with respect to one another to allow the projection to have several positions, each of said positions being spaced from the others by an arc greater than the predetermined arc of allowable rotation between said first unit and said first member;

a second unit including an opening having a first portion shaped to receive the extension and a plurality of second positions, each shaped to receive the polarizing projection when the projection is aligned with one of the second portions, said plurality of second portions spaced from one another by an arc greater than the predetermined arc; and means for blocking less then all of the second portions to selectively polarize the second unit to prevent mating with a first unit when the projection aligns with a blocked second portion and to allow mating when the projection aligns with an unblocked second portion.

* * * * *